(12) United States Patent
Vaissaud et al.

(10) Patent No.: US 10,807,416 B2
(45) Date of Patent: Oct. 20, 2020

(54) TIRE TREAD

(71) Applicant: The Goodyear Tire & Rubber Company, Akron, OH (US)

(72) Inventors: Julien Alexandre Vaissaud, Arlon (BE); Alexander Ossipov, Leuven (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 197 days.

(21) Appl. No.: 15/903,060

(22) Filed: Feb. 23, 2018

(65) Prior Publication Data

US 2019/0263186 A1 Aug. 29, 2019

(51) Int. Cl.
*B60C 11/03* (2006.01)
*B60C 11/13* (2006.01)
*B60C 11/04* (2006.01)
*B60C 11/12* (2006.01)

(52) U.S. Cl.
CPC ...... *B60C 11/0304* (2013.01); *B60C 11/0302* (2013.01); *B60C 11/0309* (2013.01); *B60C 11/04* (2013.01); *B60C 11/12* (2013.01); *B60C 11/13* (2013.01); *B60C 11/1307* (2013.01); *B60C 11/1323* (2013.01); *B60C 2011/0348* (2013.01); *B60C 2011/0353* (2013.01); *B60C 2011/0381* (2013.01); *B60C 2011/0383* (2013.01); *B60C 2011/0388* (2013.01); *B60C 2011/0393* (2013.01); *B60C 2200/04* (2013.01)

(58) Field of Classification Search
CPC . B60C 11/0304; B60C 11/13; B60C 11/1307; B60C 2011/0348; B60C 2011/0393
See application file for complete search history.

(56) References Cited

U.S. PATENT DOCUMENTS

| 5,421,391 | A | | 6/1995 | Himuro | |
|---|---|---|---|---|---|
| 5,665,184 | A | | 9/1997 | Fukumoto | |
| 5,833,780 | A | * | 11/1998 | Kishi | B60C 11/0309 |
| | | | | | 152/209.15 |
| 5,891,276 | A | | 4/1999 | Takahashi | |
| 6,000,450 | A | | 12/1999 | Kishimoto | |
| 6,006,804 | A | * | 12/1999 | Yokota | B60C 11/0309 |
| | | | | | 152/209.19 |

(Continued)

FOREIGN PATENT DOCUMENTS

| JP | 04-043104 A | * | 2/1992 |
|---|---|---|---|
| JP | 2009149124 | | 7/2009 |

OTHER PUBLICATIONS

Machine translation for Japan 04-043104 (Year: 2019).*
European Search Report for Serial No. 19156335.2 dated Apr. 26, 2019.

*Primary Examiner* — Steven D Maki
(74) *Attorney, Agent, or Firm* — Robert N. Lipcsik

(57) ABSTRACT

A tread includes a plurality of circumferential grooves. Each of the plurality extends continuously in a tire circumferential direction. The plurality of circumferential grooves defining a circumferentially extending main rib and a circumferentially extending curtain rib axially separated by a curtain groove. The curtain groove having an axial width between 4% and 40% of a minimum axial width of a main groove of the plurality of circumferential grooves. The main groove is disposed axially opposite the curtain groove and adjacent to the curtain rib.

7 Claims, 2 Drawing Sheets

(56) References Cited

U.S. PATENT DOCUMENTS

| | | | |
|---|---|---|---|
| 6,102,092 A | 8/2000 | Radulescu | |
| 6,467,517 B1 | 10/2002 | Radulescu | |
| 6,736,175 B2 | 5/2004 | Carra | |
| 7,347,238 B2 | 3/2008 | Miyasaka | |
| 7,581,574 B2 | 9/2009 | Shirouzu | |
| 7,607,464 B2 | 10/2009 | Murata | |
| D610,068 S | 2/2010 | Nagata | |
| 8,210,219 B2 | 7/2012 | Iwai | |
| 8,881,781 B2 | 11/2014 | Ookawara | |
| 9,688,106 B2 | 6/2017 | Pialot | |
| 9,744,810 B2 | 8/2017 | Sueno | |
| 2012/0037287 A1* | 2/2012 | Atake | B60C 11/0309 152/209.8 |
| 2013/0014872 A1 | 1/2013 | Dautrey | |

* cited by examiner

TIRE TREAD

FIELD OF THE INVENTION

The present invention relates to a pneumatic tire that exhibits excellent noise performance while maintaining wet performance.

BACKGROUND OF THE PRESENT INVENTION

Conventionally, in addition to circumferential main grooves and lateral grooves, pneumatic tire treads may have sipes on a tread surface in order to demonstrate favorable functional characteristics (e.g., low noise generation, low rolling resistance, good traction, good durability, etc.).

SUMMARY OF THE INVENTION

A tread in accordance with the present invention includes a plurality of circumferential grooves. Each of the plurality extends continuously in a tire circumferential direction. The plurality of circumferential grooves defining a circumferentially extending main rib and a circumferentially extending curtain rib axially separated by a curtain groove. The curtain groove having an axial width between 4% and 40% of a minimum axial width of a main groove of the plurality of circumferential grooves. The main groove is disposed axially opposite the curtain groove and adjacent to the curtain rib.

According to another aspect of the tread, the curtain groove has a radial depth less than or equal to the main groove.

According to still another aspect of the tread, the axial width of the curtain groove narrows as the curtain groove extends radially inward.

According to yet another aspect of the tread, the curtain rib has a uniform axial width between 0.5 mm and 3.5 mm.

According to still another aspect of the tread, the curtain rib has a uniform axial width of about 2.0 mm.

According to yet another aspect of the tread, the main rib has a circumferential array of axially extending lateral grooves, the lateral grooves extending from one of the plurality of circumferential grooves other than the main groove.

According to still another aspect of the tread, one end of each of the lateral grooves joins the curtain groove.

According to yet another aspect of the tread, one end of the lateral grooves intersects with the curtain groove.

According to still another aspect of the tread, the curtain groove tapers radially inward to an axial width between 0.2 mm and 0.5 mm.

According to yet another aspect of the tread, the curtain groove tapers radially inward to an axial width less than an axial width of the curtain groove at an outer surface of the tread.

A tire tread in accordance with the present invention includes a plurality of annular grooves. Each of the plurality extends continuously in a tire circumferential direction. The plurality of annular grooves defines a circumferentially extending main rib and a circumferentially extending curtain rib axially separated by a curtain groove. The curtain groove has an axial width between 4% and 10% of a minimum axial width of a main groove of the plurality of annular grooves. The main groove is located axially opposite the curtain groove and axially adjacent to the curtain rib.

According to another aspect of the tire tread, the curtain groove has a radial depth equal to the main groove.

According to still another aspect of the tire tread, the axial width of the curtain groove narrows as the curtain groove extends radially inward.

According to yet another aspect of the tire tread, the curtain rib has an axial width between 1.0 mm and 2.0 mm.

According to still another aspect of the tire tread, the curtain rib has an axial width of about 1.0 mm.

According to yet another aspect of the tire tread, the main rib has a circumferential array of axially extending lateral grooves, the lateral grooves extending from one of the plurality of circumferential grooves other than the main groove.

According to still another aspect of the tire tread, one end of each of the lateral grooves joins the curtain groove.

According to yet another aspect of the tire tread, one end of the lateral grooves intersects with the curtain groove.

According to still another aspect of the tire tread, the curtain groove tapers radially inward to an axial width between 0.5 mm and 0.7 mm.

According to yet another aspect of the tire tread, the curtain groove tapers radially inward to an axial width less than an axial width of the curtain groove at an outer surface of the tread.

BRIEF DESCRIPTION OF THE DRAWINGS

A more complete appreciation of the present invention and many of the attendant advantages thereof will be readily ascertained as the same becomes better understood by reference to the following detailed description when considered in connection with the accompanying drawings, wherein.

DETAILED DESCRIPTION OF THE EXAMPLES OF THE PRESENT INVENTION

Figure 1:
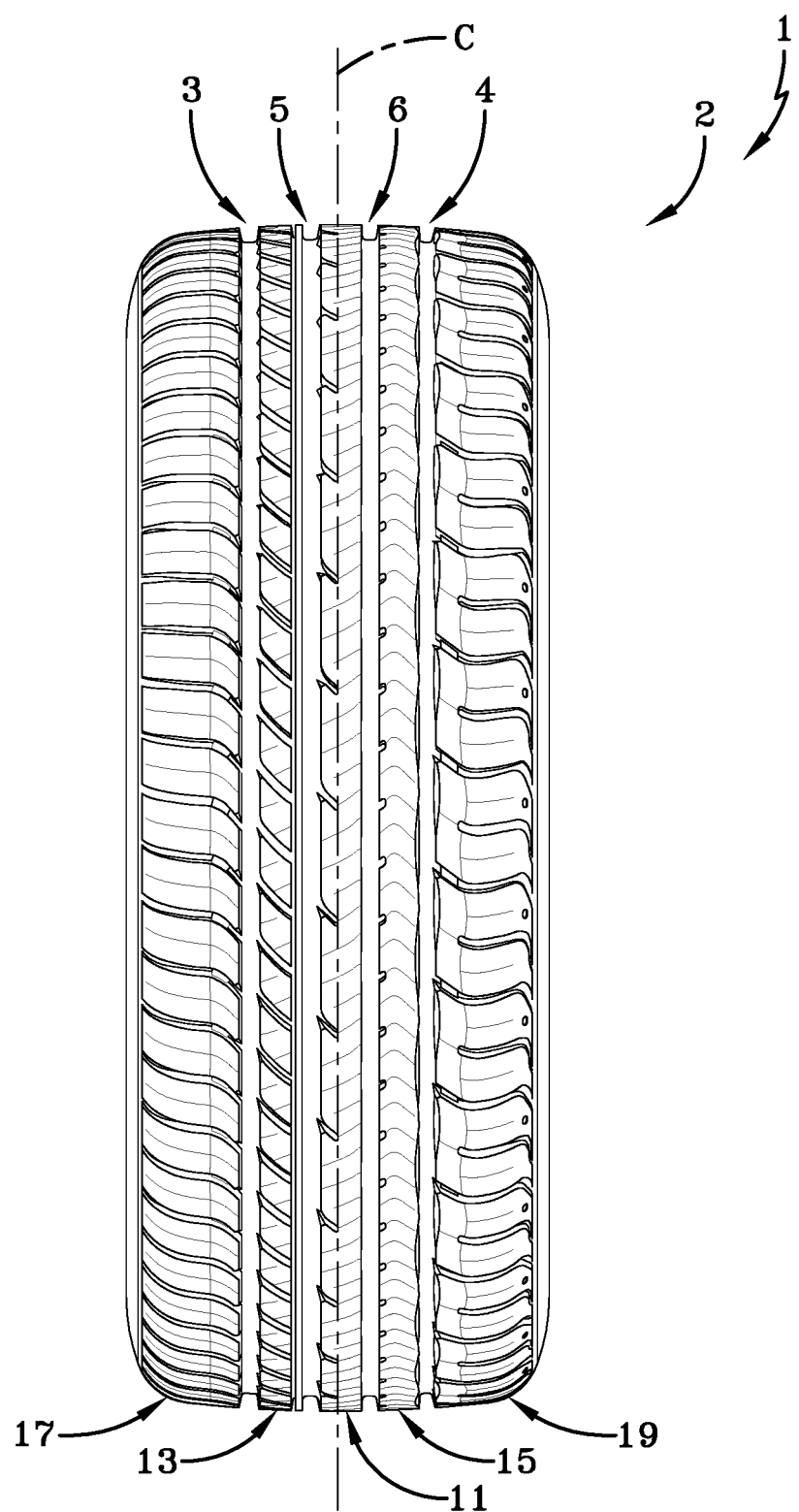
FIG. 1 schematically shows an orthogonal front view of an example tire tread in accordance with the present invention.

Examples of the present invention may be below described with reference to the accompanying drawings, wherein like reference numerals designate corresponding and/or identical elements throughout FIGS. 1-3.

Figure 2:
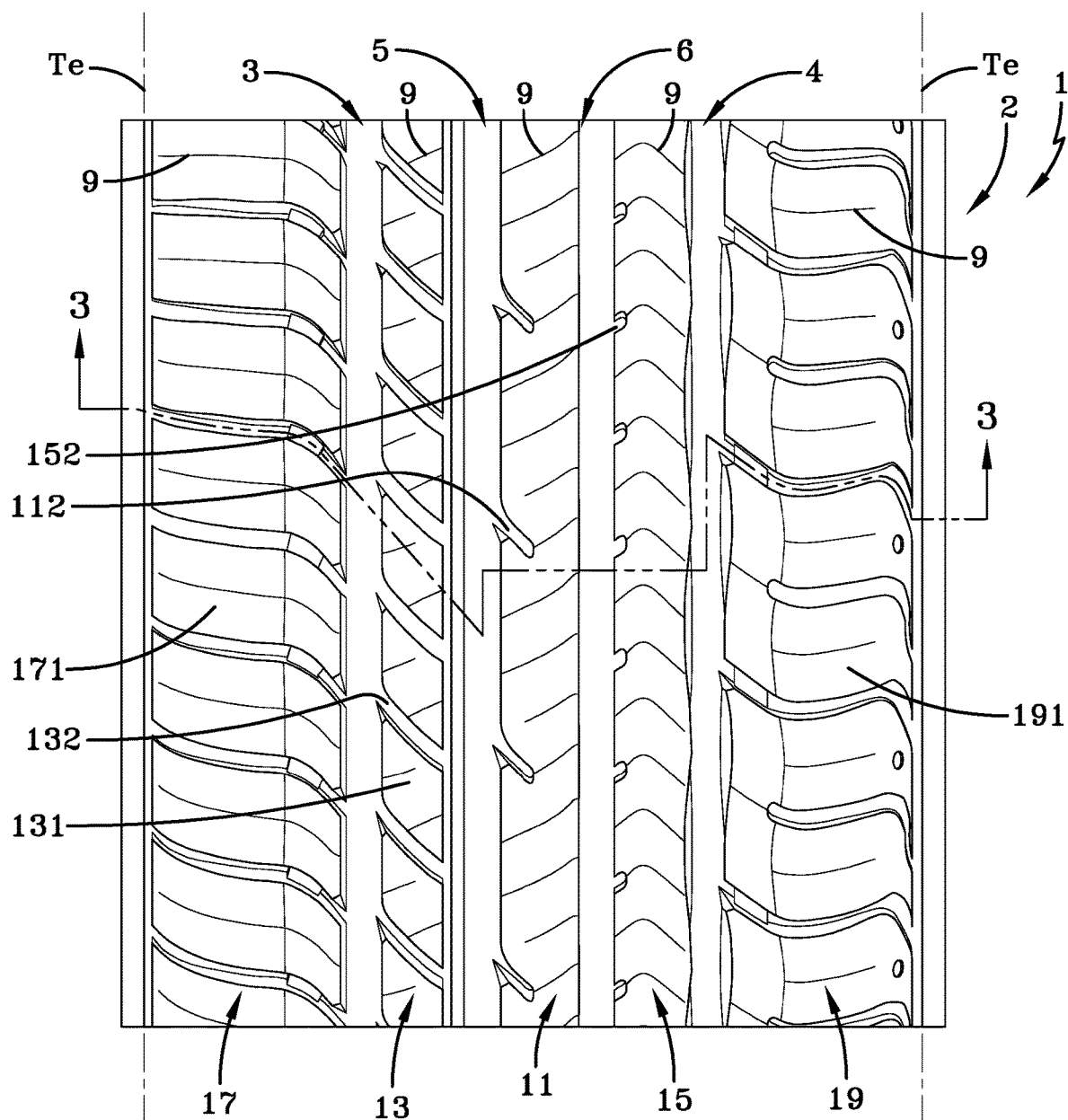
FIG. 2 schematically shows a detail view of part of the tire tread of FIG. 1.

As shown in FIGS. 1-2, an example non-pneumatic or pneumatic tire 1 according to the present invention (hereinafter may be referred to simply as "tire") may be a tire mounted in a designated direction on a vehicle. The right side of the tire 1 in FIG. 1 may be set as the outer side when it is mounted on a vehicle. The tire 1 may be asymmetrical about a tire equator C. The tire 1 may be used for a passenger car, for example.

A tread 2 of tire 1 may have a pair of shoulder grooves 3, 4 and a pair of intermediate grooves 5, 6. The shoulder grooves 3, 4 may be positioned on each side of tire equator C and closest to either footprint edge Te, Te extending continuously in a circumferential direction. The shoulder and intermediate grooves 3, 4, 5, 6 may extend circumferentially and linearly in a straight line at a substantially constant groove width.

The grooves 3, 4, 5, 6 may define five circumferentially extending ribs of tread elements: a center rib 11, a pair of intermediate ribs 13, 15, and a pair of shoulder ribs 17, 19. Each rib 11, 13, 15, 17, 19 may be spaced from an adjacent row by the circumferentially continuous grooves 3, 4, 5, 6.

The tread elements 131 of the first intermediate rib 13 may define a circumferential array of spaced apart downwardly angled lateral grooves 132 extending from the first shoulder groove 3 toward the first intermediate groove 5. The continuous center rib 11 may have a circumferential array of widely spaced apart downwardly angled blind lateral grooves 112 extending at a downward angle from the first intermediate groove 5. The continuous second intermediate rib 15 may have a circumferential array of widely spaced apart shorter blind lateral grooves 152 extending from the second intermediate groove 6. The tread elements 171 of the first shoulder rib 17 may define a circumferential array of downwardly arched lateral grooves 172 extending from the outer edge Te to the first shoulder groove 3. The tread elements 191 of the second shoulder rib 19 may define a circumferential array of upwardly arched lateral grooves 192 extending from the outer edge Te to the first shoulder groove 4. Various other sipes 9 may be located across the ribs 11, 13, 15, 17, 19 of the tread 2, as specifically shown in FIG. 2.

Figure 3:
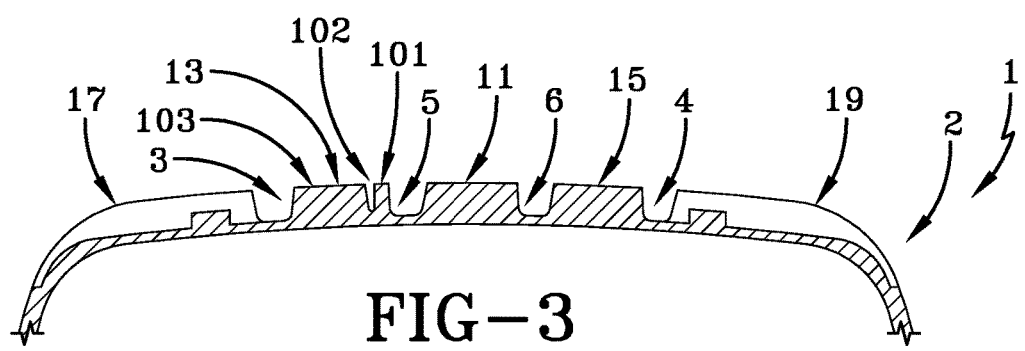
FIG. 3 schematically shows a section view taken along line 3-3 in FIG. 2.

FIG. 3 shows a cross-sectional view taken at "3-3" in FIG. 2. In accordance with the present invention, the example tread 2 may further define a circumferentially extending rib, or curtain 101, coupled with one or more or all of the ribs 11, 13, 15, 19 for reducing airborne/exterior noise propagation of the tread during rotation of the tire 1 under load. The curtain 101 may be coupled to the rib 11, 13, 15, 17, and/or 19. In the example tire 1 and tread 2 of FIGS. 1-3, a narrow curtain 101 and the first intermediate rib 13 are coupled by a narrow circumferential curtain groove 102. The curtain 101 may be the same radial height as the first intermediate rib 13 and have a uniform axial width between 0.5 mm and 3.5 mm or 0.5 mm and 1.5 mm. The axial width of the of the curtain groove 102 at an outer surface 103 of the tread 2 may be between 0.5 mm and 3.5 mm. As the curtain groove 102 extends radially inward, the axial width may lessen, or taper, to an axial width between 0.5 mm and 0.2 mm (FIG. 3). The radial depth of the curtain groove 102 may be less than or equal to the radial depth of the first intermediate groove 5 or the corresponding circumferential groove 3, 4, 5, and/or 6. The circumferential grooves 3, 4, 5, 6 may have minimum axial widths between 4.0 mm and 16.0 mm Thus, the axial width of the curtain groove 102 may be between 4% and 20% or 4% and 40% the minimum axial width of the first intermediate groove 5.

In one set of examples, the axial width of the curtain groove 102 at the outer surface 103 of the tread 2 may be 1.0 mm tapering to a 0.3 mm axial width at the radially innermost end of the curtain groove and the minimum axial width of the first intermediate groove 5 may be 5.0 mm, 11.0 mm, or 7.0 mm. In these examples, the axial width of the curtain groove 102 may be 20%, 9%, or 14% the minimum axial width of the first intermediate groove 5.

In another set of examples, the axial width of the of the curtain groove 102 at the outer surface 103 of the tread 2 may be 1.0 mm tapering to a 0.3 mm axial width at the radially innermost end of the curtain groove and the minimum axial width of the first intermediate groove 5 may be 5.1 mm, 10.8 mm, or 6.7 mm. In these examples, the axial width of the curtain groove 102 may be approximately 20%, 9%, or 15% the minimum axial width of the first intermediate groove 5.

In the example of FIGS. 1-3, the lateral grooves 132 of the first intermediate rib 13 may extend and join the curtain groove 102 in order to further suppress noise propagation. These examples of a narrow curtain 101 and a narrow curtain groove 102 thereby advantageously have very little, if any, effect on other tire characteristics, such as handling, wear, rolling resistance, and/or traction. Further, the addition of the curtain groove 102 may only lessen tire weight and material costs.

So far, a tire according to the present invention has been described in detail. However, the present invention is not limited to the above examples, and various modifications of the example may also apply. Numerous modifications and variations of the present invention are possible in light of the above teachings. It is therefore to be understood that within the scope of the appended claims, the present invention may be practiced otherwise than as specifically and exemplarily described herein.

What is claimed:

1. A tire tread comprises:
a plurality of circumferential grooves, each of the plurality extending continuously in a tire circumferential direction,
the plurality of circumferential grooves defining a circumferentially extending main rib and a circumferentially extending curtain rib axially separated by a curtain groove, the curtain groove having an axial width between 4% and 40% of a minimum axial width of a main groove of the plurality of circumferential grooves, the main groove being disposed axially opposite the curtain groove and adjacent to the curtain rib,
the plurality of circumferential grooves further defining a first auxiliary rib and a second auxiliary rib each extending circumferentially and substantially continuously in the tire circumferential direction, each auxiliary rib having an auxiliary curtain rib on only one axial side of each auxiliary rib and being separated from the auxiliary curtain rib by an auxiliary curtain groove,
the axial width of the curtain groove and axial widths of the auxiliary curtain grooves narrowing as the curtain groove and auxiliary curtain grooves extend radially inward,
the main rib having a circumferential array of axially extending lateral grooves, the lateral grooves extending from one of the plurality of circumferential grooves other than the main groove.

2. The tire as set forth in claim 1 wherein the curtain groove has a radial depth less than or equal to the main groove.

3. The tire as set forth in claim 1 wherein the curtain rib has a uniform axial width between 0.5 mm and 3.5 mm.

4. The tire as set forth in claim 1 wherein the curtain rib has a uniform axial width of about 2.0 mm.

5. The tire as set forth in claim 1 wherein one end of the lateral grooves intersects with the curtain groove.

6. The tire as set forth in claim 1 wherein the curtain groove tapers radially inward to an axial width between 0.2 mm and 0.5 mm.

7. The tire as set forth in claim 1 wherein the curtain groove tapers radially inward to an axial width less than an axial width of the curtain groove at an outer surface of the tread.

* * * * *